S. D. REYNOLDS.

Horse-Collar.

No. 8,746. Reissued June 10, 1879.

WITNESSES

E. J. Nottingham

A. M. Bright

INVENTOR

S. D. Reynolds

By Freggett and Freggett

ATTORNEYS

N. PETERS, PHOTO-LITHOGRAPHER, WASHINGTON, D. C.

UNITED STATES PATENT OFFICE.

SAMUEL D. REYNOLDS, OF ROCHELLE, ILLINOIS.

IMPROVEMENT IN HORSE-COLLARS.

Specification forming part of Letters Patent No. 195,649, dated September 25, 1877; Reissue No. 8,746, dated June 10, 1879; application filed May 3, 1879.

*To all whom it may concern:*

Be it known that I, SAMUEL D. REYNOLDS, of Rochelle, in the county of Ogle and State of Illinois, have invented certain new and useful Improvements in Horse-Collars; and I do hereby declare the following to be a full, clear, and exact description of the invention, such as will enable others skilled in the art to which it pertains to make and use it, reference being had to the accompanying drawings, which form part of this specification.

My invention relates to a combined hame and collar for horses; and consists in a collar formed of two metallic sections, said sections being made with their edges extending laterally away from the collar-opening to constitute broad curved bearings for the breast and neck of the animal.

Figure 1:
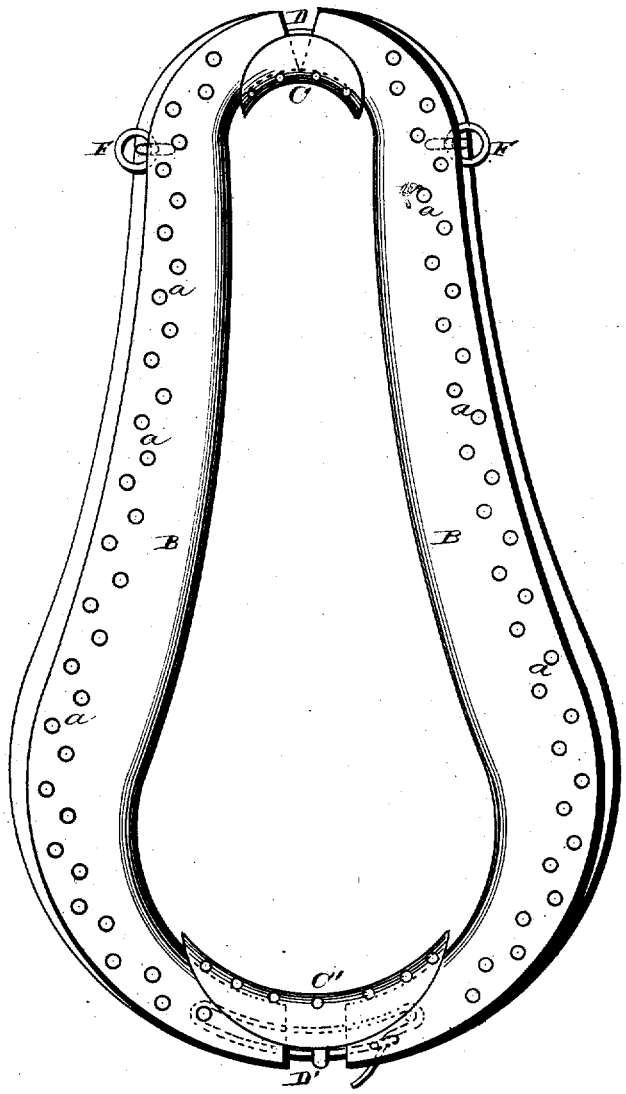
Figure 2:
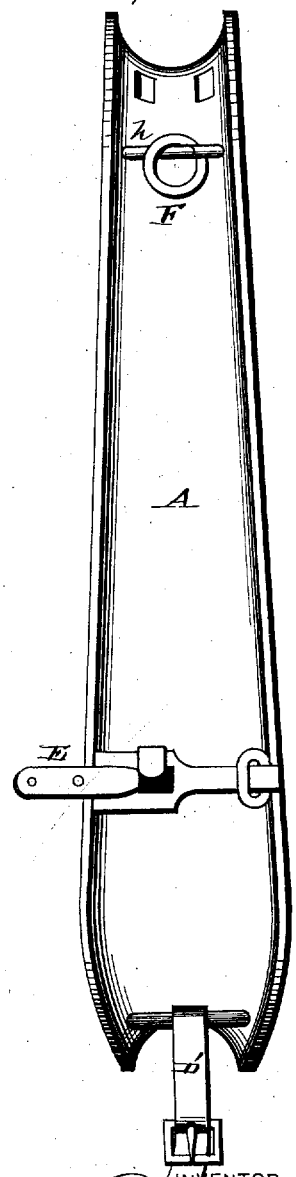

Referring to the drawings, Figure 1 is a view, in front elevation, of my collar. Fig. 2 shows the outer or concave side of one of the half-sections.

I make the combined collar and hame of cast metal and in two independent parts, each section of concavo outer side, A, and convex inner side, B, the object being to render the collar as light in wear as possible. At the same time a further advantage is found in the peculiar fitness of this shaped collar to the neck and shoulders of a horse. A rocking or rolling motion obtains thereby, which allows the collar to yield to side draft immaterially for either of its sectional halves, and in this way the shoulders of the animal are prevented from becoming chafed by a wearing or sliding movement of the collar-sides as the latter are acted upon by unequal drafts. As the collar is a mere shell in its metallic construction, it is very light, and is readily worn by the animal, while, if desired, padding may be used. For this purpose the perforations or holes *a* may be employed through which to pass the stitching, though the primary importance of the openings is to make the collar light.

The keepers C C′ at respectively the top and bottom parts of the two sections of the collar act in conjunction with the corresponding connecting-straps D D′ in adjusting the collar in width to the different-sized shoulders of the animals. As both of these fastenings or connections are flexible, they allow each collar-section to independently move up or down and rock against the horse freely. This easy-rolling movement of either side of the collar I regard as an important feature when taken in connection with the curved or rounded side of the collar worn next against the animal. The draft irons E provide means for connecting the tugs or traces to the collar, and also serve to brace or strengthen their respective shell-sections.

Rein-eyes F are connected to the collar by means of the cross-pieces *h*, and the entire construction of the device makes the dispensing of an independent hame practicable in use.

Having fully described my invention, what I claim as new, and desire to secure by Letters Patent, is—

1. A collar formed of two metallic shell-sections, each section constructed with laterally-projecting flanges, and connected so that the bearing-surface around the collar-opening will be formed with broad curved surfaces to bear on the breast and neck of the animal, substantially as set forth.

2. A collar formed of two metallic shell-sections, each section made substantially of U shape in cross-section, and arranged so that the edges of the collar will project laterally or away from the collar-opening, substantially as set forth.

3. A collar formed of metallic shell-sections, each section constructed with broad curved breast and neck bearing-surfaces and with the edges extending laterally away from the collar-opening, the bearing-surfaces of each section gradually decreasing in width from the widest portion of the collar to its upper and lower ends, substantially as set forth.

4. A metallic collar each section of which is constructed with broad curved breast and neck bearing-surfaces and with the edges extending laterally away from the collar-opening, the two flanges of the collar connected by a brace having a rein-eye attached thereto, substantially as set forth.

5. A metallic collar composed of two sections, each section consisting of a shell, the edges of which extend laterally away from the collar-opening, the lower portions of each section provided with a device for the attachment of the collar-fastening strap, substantially as set forth.

6. A metallic collar composed of two sections, each section made of concavo-convex form, said sections being secured to each other, so that the convex portions shall bear against the breast and neck of the animal, and also extend laterally outward from the neck, substantially as set forth.

7. A collar formed of two metallic shell-sections, each section constructed with flanges extending laterally outward from the collar-opening, in combination with the neck and breast keepers or protectors C C′, substantially as set forth.

In testimony that I claim the foregoing I have hereunto set my hand this 18th day of April, 1879.

SAMUEL D. REYNOLDS.

Witnesses:

S. J. SMITH,

C. C. BENNETT.